(12) United States Patent
Garg et al.

(10) Patent No.: US 12,542,650 B2
(45) Date of Patent: Feb. 3, 2026

(54) ARTIFICIAL INTELLIGENCE (AI) BASED CLOUD ARCHITECTURE SEGMENTATION LEVERAGING HOMOMORPHIC ENCRYPTION

(71) Applicant: Bank of America Corporation, Charlotte, NC (US)

(72) Inventors: Saurabh Garg, Faridabad (IN); Bhagat Allugubelly, Hyderabad (IN); Maneesh Sethia, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 192 days.

(21) Appl. No.: 18/376,138

(22) Filed: Oct. 3, 2023

(65) Prior Publication Data

US 2025/0112758 A1    Apr. 3, 2025

(51) Int. Cl.
*H04L 9/00* (2022.01)
*G06F 21/60* (2013.01)

(52) U.S. Cl.
CPC ............ *H04L 9/008* (2013.01); *G06F 21/602* (2013.01)

(58) Field of Classification Search
CPC ......... H04L 9/008; H04L 9/3239; H04L 9/50; G06F 21/602
See application file for complete search history.

(56) References Cited

U.S. PATENT DOCUMENTS

| 8,630,422 B2 | 1/2014 | Gentry |
| 9,716,590 B2 | 7/2017 | Gentry |
| 10,546,141 B2 | 1/2020 | Miguel et al. |
| 11,374,736 B2 | 6/2022 | Gao |
| 11,777,707 B2 | 10/2023 | Ghosh et al. |
| 11,777,729 B2 | 10/2023 | Williams et al. |
| 11,790,459 B1 * | 10/2023 | Strauss ................... G06Q 40/08 705/4 |
| 12,309,182 B1 * | 5/2025 | McAleer ................ G06F 9/455 |
| 2020/0019864 A1 * | 1/2020 | Gu ...................... G05B 19/4183 |
| 2020/0151356 A1 | 5/2020 | Rohloff et al. |
| 2020/0225655 A1 * | 7/2020 | Cella ................... G06F 18/2178 |

(Continued)

FOREIGN PATENT DOCUMENTS

| CN | 107181584 B | 2/2020 |
| CN | 108462575 B | 10/2020 |

*Primary Examiner* — Meng Li
(74) *Attorney, Agent, or Firm* — Banner & Witcoff, Ltd.

(57) ABSTRACT

A computing platform may train, using smart contract and file type information, a homomorphic encryption model, which may configure the homomorphic encryption model to identify, for a given input file, a corresponding smart contract defining a corresponding set of parameters, included in the given input file, for display. The computing platform may receive an unencrypted file, and may identify, by inputting the unencrypted file into the homomorphic encryption model, a smart contract defining one or more parameters for display. The computing platform may encrypt, using homomorphic encryption, the unencrypted file to produce an encrypted file, and may store the encrypted file. The computing platform may receive, via an application programming interface (API) at a user device, a request to access the encrypted file. The computing platform may send, based on the smart contract and for display at the user device via the API, the parameters for display.

20 Claims, 8 Drawing Sheets

(56) References Cited

U.S. PATENT DOCUMENTS

| | | | |
|---|---|---|---|
| 2020/0250663 A1* | 8/2020 | Abad | H04L 9/0637 |
| 2020/0322323 A1* | 10/2020 | Corning | H04L 63/10 |
| 2021/0099287 A1 | 4/2021 | Keselman et al. | |
| 2021/0117408 A1* | 4/2021 | Figueredo de Santana | G06F 16/9024 |
| 2021/0366586 A1* | 11/2021 | Ryan | G06Q 20/3224 |
| 2021/0390599 A1* | 12/2021 | Tardiou | G06Q 50/188 |
| 2021/0398017 A1* | 12/2021 | Garg | H04L 9/50 |
| 2022/0366494 A1* | 11/2022 | Cella | H04L 9/50 |
| 2022/0398341 A1* | 12/2022 | Diaz-Mitoma | G06F 21/6245 |
| 2023/0006809 A1 | 1/2023 | Shpurov et al. | |
| 2023/0113896 A1* | 4/2023 | Milazzo | H04L 9/085 713/164 |
| 2023/0185919 A1 | 6/2023 | Bond | |
| 2023/0188316 A1 | 6/2023 | Springer, IV et al. | |
| 2023/0188317 A1 | 6/2023 | Choi et al. | |
| 2023/0188320 A1 | 6/2023 | Park et al. | |
| 2023/0188321 A1* | 6/2023 | Jing | H04L 9/008 380/28 |
| 2023/0188322 A1 | 6/2023 | Bajpeyi et al. | |
| 2023/0198740 A1 | 6/2023 | Kachare et al. | |
| 2023/0208610 A1 | 6/2023 | Shaul et al. | |
| 2023/0208638 A1* | 6/2023 | Manevich | H04L 9/3247 713/171 |
| 2023/0216655 A1 | 7/2023 | Liao et al. | |
| 2023/0216656 A1 | 7/2023 | Liao et al. | |
| 2023/0216657 A1 | 7/2023 | Aharoni et al. | |
| 2023/0246807 A1 | 8/2023 | Lee et al. | |
| 2023/0254125 A1 | 8/2023 | No et al. | |
| 2023/0269067 A1 | 8/2023 | Son et al. | |
| 2023/0269069 A1 | 8/2023 | No et al. | |
| 2023/0291541 A1 | 9/2023 | Gupta et al. | |
| 2023/0297649 A1 | 9/2023 | Drucker et al. | |
| 2023/0306237 A1 | 9/2023 | Greenberg et al. | |
| 2023/0396453 A1* | 12/2023 | Jain | H04L 9/3213 |
| 2024/0070306 A1* | 2/2024 | Jurat | G06F 21/1014 |
| 2024/0106846 A1* | 3/2024 | Kapoor | H04L 63/10 |
| 2024/0144381 A1* | 5/2024 | Martine | G16H 40/67 |
| 2024/0273535 A1* | 8/2024 | Fang | G06Q 20/065 |
| 2024/0370861 A1* | 11/2024 | Benvenuti | H04L 9/3278 |
| 2024/0370865 A1* | 11/2024 | Bernardi | G06Q 20/36 |
| 2025/0112758 A1* | 4/2025 | Garg | H04L 9/3239 |

* cited by examiner

Encrypted File Display Interface

The available parameters from the requested file are shown below:

Parameter #1: Value #1
Parameter #2: Value #2
Parameter #3: Value #3

FIG. 4

ARTIFICIAL INTELLIGENCE (AI) BASED CLOUD ARCHITECTURE SEGMENTATION LEVERAGING HOMOMORPHIC ENCRYPTION

BACKGROUND

In some instances, multi-cloud environments may be used for secure information storage. In some instances, these environments may be protected by a two factor security mechanism. For example, the first factor may be single encryption of plaintext information, and the second factor may be a unique personal security key. For example, users may encrypt information and may upload it to the cloud environment. Then, using the security key, the information may be downloaded. In these instances, however, if the unique personal security key is obtained by a bad actor, it may be easy to decrypt the information.

In some instances, leakage resilient encryption may be used to enhance the security. In these instances, a secret key may be split into two parts, with one part being stored in a computing environment and another being embedded into the key itself. If the key is lost, it may be revoked. If any part of the secret key is known to an attacker, it may similarly be easy to decrypt the information. Accordingly, it may be important to improve mechanisms for information security in multi-cloud environments.

SUMMARY

Aspects of the disclosure provide effective, efficient, scalable, and convenient technical solutions that address and overcome the technical problems associated with information security in cloud based architecture environments. In one or more instances, a computing platform having at least one processor, a communication interface, and memory may train, using smart contract and file type information, a homomorphic encryption model, which may configure the homomorphic encryption model to identify, for a given input file, a corresponding smart contract defining a corresponding set of parameters, included in the given input file, for display. The computing platform may receive an unencrypted file. The computing platform may identify, by inputting the unencrypted file into the homomorphic encryption model, a smart contract defining one or more parameters for display. The computing platform may encrypt, using homomorphic encryption, the unencrypted file to produce an encrypted file. The computing platform may store the encrypted file. The computing platform may receive, via an application programming interface (API) at a user device, a request to access the encrypted file and authentication credentials. The computing platform may send, based on the smart contract, based on validation of the authentication credentials, and for display at the user device via the API, the parameters for display.

In one or more instances, the homomorphic encryption model may be an artificial intelligence (AI) model. In one or more instances, the homomorphic encryption model may be further trained using historical system performance information, and training the homomorphic encryption model using the historical system performance information may configure the homomorphic encryption model to output, for the given input file, one or more corresponding processing resources of the computing platform at which to perform one or more of: the homomorphic encryption or the storage of the encrypted file.

In one or more examples, the computing platform may identify, by inputting the unencrypted file and current system performance information into the homomorphic encryption model, one or more processing resources of the computing platform at which to perform the homomorphic encryption or the storage of the encrypted file. In one or more examples, the current system performance information may include one or more of: system latency, available memory, available processing resources, or system load.

In one or more instances, the smart contract may define the one or more parameters for display and one or more parameters to remain concealed. In one or more instances, the smart contract may define different parameters for display for different users.

In one or more examples, the computing platform may generate a file token representing the unencrypted file. The computing platform may store, using a distributed ledger, the file token.

In one or more instances, the file token may be one of a non-fungible token (NFT) or a crypto token. In one or more instances, sending the parameters for display may include sending the parameters without decrypting the encrypted file.

In one or more examples, the computing platform may update, based on the identified smart contract, the homomorphic encryption model. In one or more examples, the computing platform may identify, based on the authentication credentials, a user identity, which may include sending, based on the user identity, a subset of the parameters for display.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction of the concepts described in further detail below, systems and methods for improved information security leveraging artificial intelligence (AI) and homomorphic encryption are described herein. For example, achieving data security and privacy over multi-cloud environments with robust cybersecurity may be challenges in the fast evolving cloud computing world.

In most of the existing systems, two factor data security mechanisms for cloud storage systems may be used. The first factor may be single encryption of the plaintext and the other factor may be a unique personal security key. The user initially may encrypt the data and upload it in the cloud. Then, using the security key, the data may be downloaded from the cloud.

In some instances, leakage resilient encryption may be used to enhance the security. The security key may be split into two parts. One part may be stored in a computer and the other part may be embedded into the key. If the key is lost, it may be revoked. If even any one part of the security key is known to the attacker, then it may be easy to decrypt the data. So the existing system may fail to provide security to the data stored in the cloud.

This system describes a novel multi factor security protection mechanism for data stored in the cloud. The system may be based on homomorphic encryption (HE) with identity based encryption (IBE), which may include ID-based cryptography using ciphertext. Methods of homomorphic operation with an AI algorithm and secure data access management may manage multi cloud storage, and an IBE coupling may be bound by a holochain framework for a lineage storage process. This may enable the processing of complex homomorphic operations that may be performed on cipher text itself beyond existing mathematic operations to achieve zero trust leveraging homomorphic encryption to protect data from fraudulency over cloud storage.

This system may allow any party to generate a public key from known identity values as an ASCII string. A trusted third party private key generator (PKG) may generate the corresponding private keys. It may provide a parent key, which the parties may encrypt without prior distribution of keys between individual participants. The three factors may include: 1) encryption of plaintext using public key of the receiver, 2) the automatic encryption in the cloud using an AI program, and 3) the homomorphic encryption to convert data into ciphertext.

This concept may involve homomorphic operations with an AI algorithm using secure data access management methods that manage multi cloud storage coordination and IBE coupling, and which binds a holochain framework for a lineage storage process. This may enable processing of complex homomorphic operations using a cipher text itself beyond existing mathematic operations to achieve zero trust leveraging homomorphic encryption to protect data from fraudulency over cloud storage.

This solution minimizes the risk exposure by minimizing the need for data decryption itself. Additionally, by storing cipher text data in different storage locations, authenticity, permissions, confidentiality, and/or privilege related risks may be reduced and root causes for many cyber security issues may be managed to not only enhance the confidentiality of the data, but also to offer a strong linage storage process for the revocability/restoral process of the data.

Figure 1A:
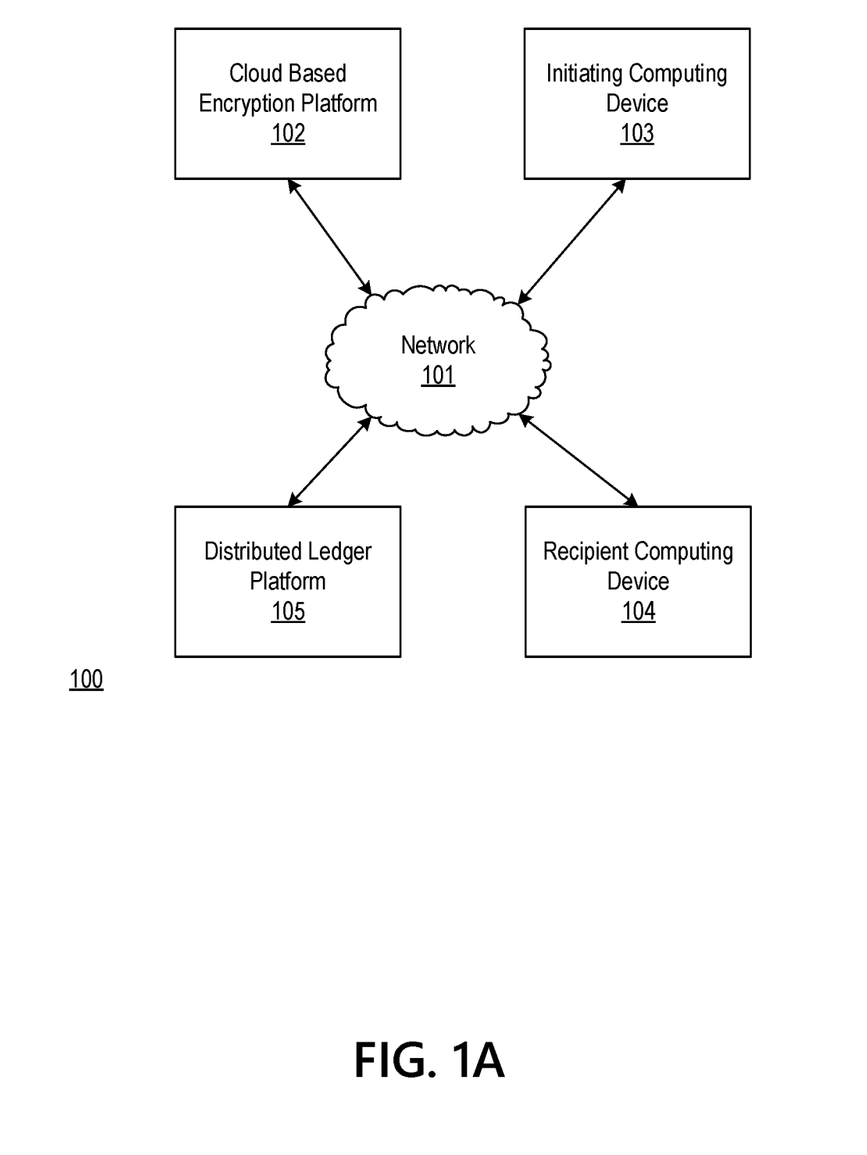
FIGS. 1A-1B depict an illustrative computing environment for leveraging artificial intelligence and homomorphic encryption in a cloud based environment in accordance with one or more example embodiments.
Figure 1B:
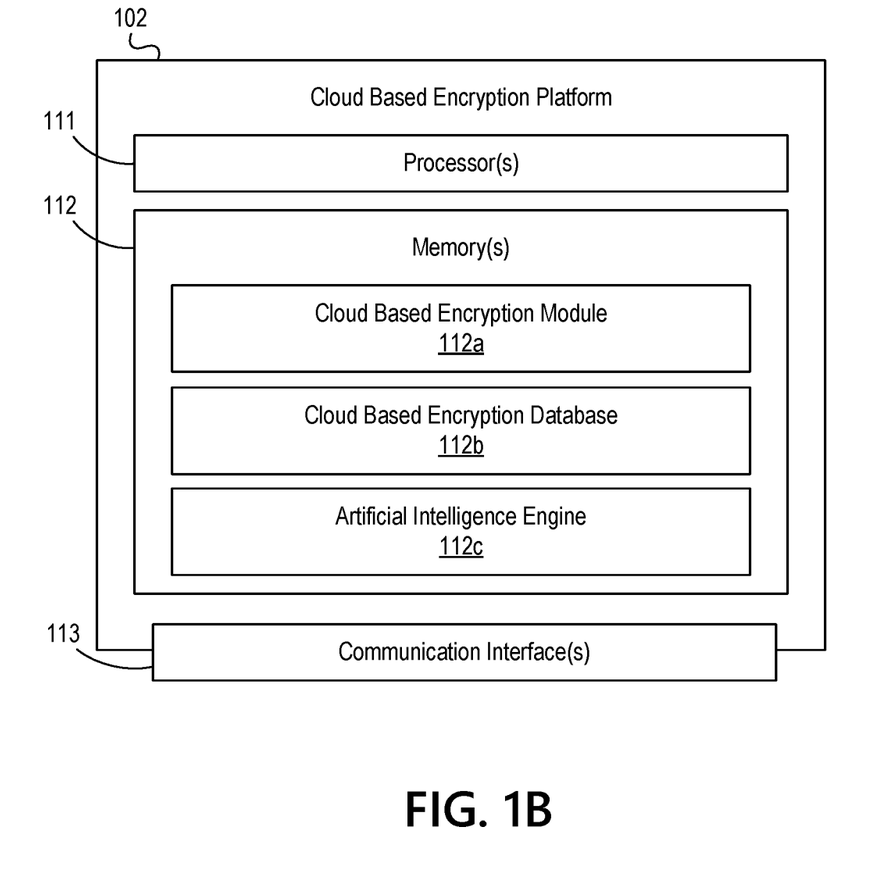

FIGS. 1A-1B depict an illustrative computing environment for leveraging artificial intelligence and homomorphic encryption in a cloud based environment in accordance with one or more example embodiments. Referring to FIG. 1A, computing environment 100 may include one or more computer systems. For example, computing environment 100 may include cloud based encryption platform 102, initiating computing device 103, recipient computing device 104, and distributed ledger platform 105.

As described further below, cloud based encryption platform 102 may be a computer system that includes one or more computing devices (e.g., servers, server blades, or the like) and/or other computer components (e.g., processors, memories, communication interfaces) that may be used to provide cloud based information security. For example, cloud based encryption platform 102 may be configured to train, host, and/or otherwise maintain a model (e.g., an artificial intelligence model, or the like), which may be configured to identify relevant smart contracts for a given input file, encrypt the input file using homomorphic encryption, and provide access to information of the input file via an application programming interface.

Initiating computing device 103 may be and/or otherwise include a laptop computer, desktop computer, mobile device, tablet, smartphone, and/or other device that may be used by an individual and/or on behalf of an enterprise organization. In some instances, initiating computing device 103 may be configured to display one or more user interfaces (e.g., file upload interfaces, or the like).

Recipient computing device 104 may be and/or otherwise include a laptop computer, desktop computer, mobile device, tablet, smartphone, and/or other device that may be used by an individual and/or on behalf of an enterprise organization. In some instances, recipient computing device 104 may be configured to display one or more user interfaces (e.g., file display interfaces, or the like).

Although a single initiating computing device 103 and recipient computing device 104 are described herein, any number of such computing devices may be implemented in the methods described herein without departing from the scope of the disclosure.

Distributed ledger platform 105 may be a computer system that includes one or more computing devices (e.g., servers, server blades, or the like) and/or other computer components (e.g., processors, memories, communication interfaces) that may be used to provide distributed file storage and/or validation services. For example, the distributed ledger platform 105 may be configured to establish and/or otherwise maintain a ledger such as a blockchain ledger, holochain ledger, or the like, to maintain and/or otherwise store non-fungible tokens (NFTs), crypto tokens, and/or other tokens in a distributed and immutable manner.

Computing environment 100 also may include one or more networks, which may interconnect cloud based encryption platform 102, initiating computing device 103, recipient computing device 104, distributed ledger platform 105, or the like. For example, computing environment 100 may include a network 101 (which may interconnect, e.g., cloud based encryption platform 102, initiating computing device 103, recipient computing device 104, distributed ledger platform 105, or the like).

In one or more arrangements, cloud based encryption platform 102, initiating computing device 103, recipient computing device 104, and distributed ledger platform 105, may be any type of computing device capable of sending and/or receiving requests and processing the requests accordingly. For example, cloud based encryption platform 102, initiating computing device 103, recipient computing device 104, distributed ledger platform 105, and/or the other systems included in computing environment 100 may, in some instances, be and/or include server computers, desktop computers, laptop computers, tablet computers, smart phones, or the like that may include one or more processors, memories, communication interfaces, storage devices, and/ or other components. As noted above, and as illustrated in greater detail below, any and/or all of cloud based encryption platform 102, initiating computing device 103, recipient computing device 104, and distributed ledger platform 105 may, in some instances, be special-purpose computing devices configured to perform specific functions.

Referring to FIG. 1B, cloud based encryption platform 102 may include one or more processors 111, memory 112, and communication interface 113. A data bus may interconnect processor 111, memory 112, and communication interface 113. Communication interface 113 may be a network interface configured to support communication between cloud based encryption platform 102 and one or more networks (e.g., network 101, or the like). Memory 112 may include one or more program modules having instructions that when executed by processor 111 cause cloud based encryption platform 102 to perform one or more functions described herein and/or one or more databases that may store and/or otherwise maintain information which may be used by such program modules and/or processor 111. In some instances, the one or more program modules and/or databases may be stored by and/or maintained in different memory units of cloud based encryption platform 102 and/or by different computing devices that may form and/or otherwise make up cloud based encryption platform 102. For example, memory 112 may have, host, store, and/or include cloud based encryption module 112a, cloud based encryption database 112b, and artificial intelligence engine 112c.

Cloud based encryption module 112a may have instructions that direct and/or cause cloud based encryption platform 102 to provide improved information security techniques, as discussed in greater detail below. Cloud based encryption database 112b may store information used by cloud based encryption module 112a and/or cloud based encryption platform 102 in application of advanced techniques to provide improved information security services, and/or in performing other functions. Artificial intelligence engine 112c may train, host, and/or otherwise refine a model that may be used to perform dynamic smart contract and/or resource selection for improved information security, and/or other functions.

Figure 2A:
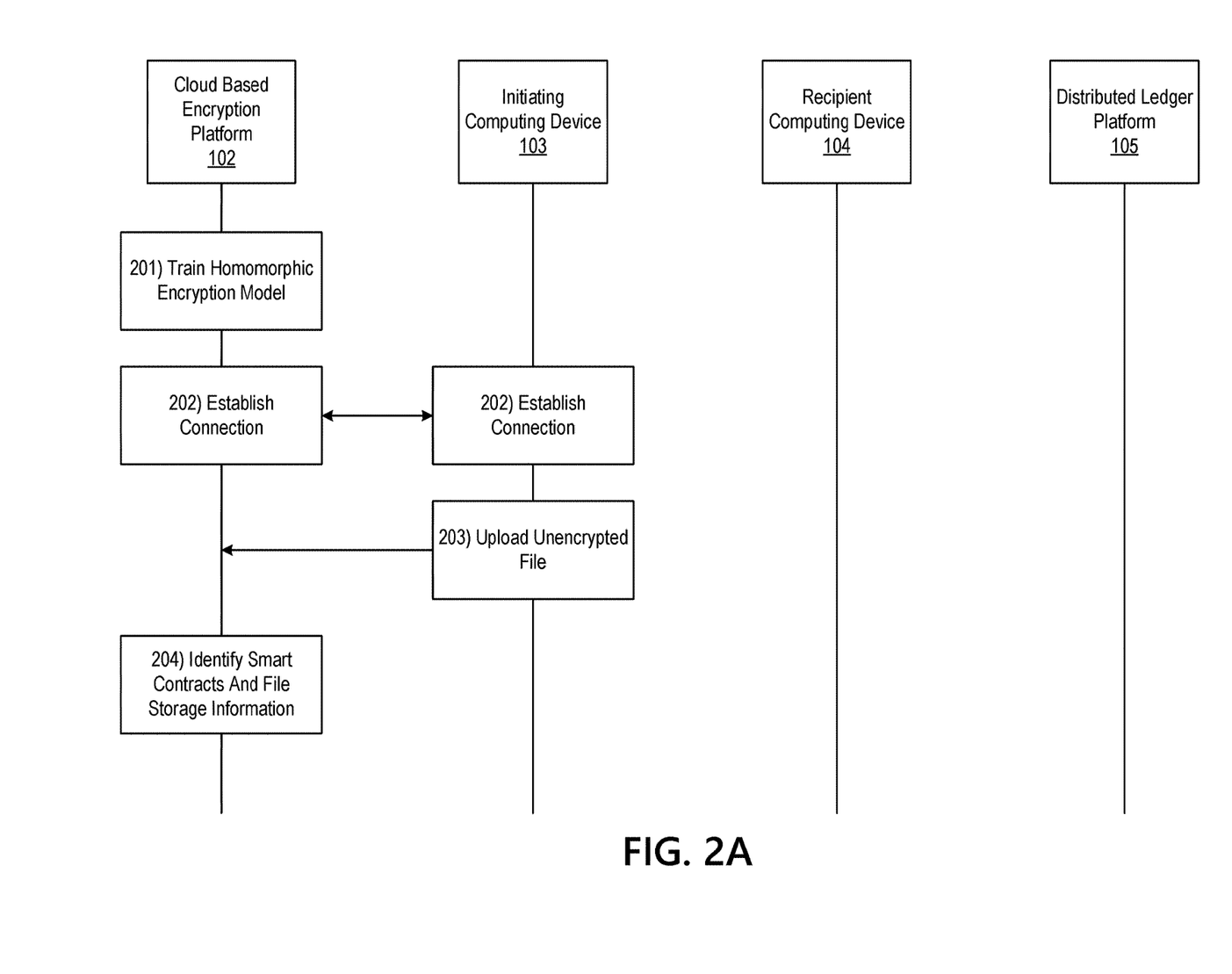
FIGS. 2A-2D depict an illustrative event sequence for leveraging artificial intelligence and homomorphic encryption in a cloud based environment in accordance with one or more example embodiments.

FIGS. 2A-2D depict an illustrative event sequence for leveraging artificial intelligence and homomorphic encryption in a cloud based environment in accordance with one or more example embodiments. Referring to FIG. 2A, at step 201, the cloud based encryption platform 102 may train a machine learning model (e.g., a homomorphic encryption model). For example, the cloud based encryption platform 102 may train the homomorphic encryption model to identify smart contracts for a given input file, which may, e.g., define rules for what information and/or parameters in the input file should be obscured versus displayed. In some instances, these smart contracts may define further subsets of rules which may vary based on a user identity of an individual attempting to access the input files (e.g., based on an IP address, user location, geolocation, and/or other information). For example, the cloud based encryption platform 102 may receive historical file information (e.g., type of file, information included in the file, or the like), smart contract information (e.g., indicating the rules of the given smart contract), and/or other information. The cloud based encryption platform 102 may input the historical information into the homomorphic encryption model to train the homomorphic encryption model to establish stored correlations between the file types and smart contracts. In doing so, the cloud based encryption platform 102 may train the homomorphic encryption model to identify, based on an input file, a corresponding smart contract that may be used to obscure information of the input file accordingly.

Additionally, the cloud based encryption platform 102 may train the homomorphic encryption model to identify processing resources (e.g., for performing the file encryption, file storage, or the like) for a given input file, which may, e.g., define where processing may occur for the input file. For example, the cloud based encryption platform 102 may receive historical processing information (e.g., system availabilities, memory, processing capabilities, system latencies, or the like), file information (e.g., type of file, information included in the file, or the like), and/or other information. The cloud based encryption platform 102 may input the historical information into the homomorphic encryption model to train the homomorphic encryption model to establish stored correlations between the file types and processing resources. In doing so, the cloud based encryption platform 102 may train the homomorphic encryption model to identify, based on an input file, corresponding processing resources that may be used to obscure information of the input file accordingly.

In some instances, in training the homomorphic encryption model, the cloud based encryption platform 102 may train a supervised learning model (e.g., decision tree, bagging, boosting, random forest, neural network, linear regression, artificial neural network, support vector machine, and/ or other supervised learning model), unsupervised learning model (e.g., classification, clustering, anomaly detection, feature engineering, feature learning, and/or other unsupervised learning models), and/or other model.

At step 202, the initiating computing device 103 may establish a connection with the cloud based encryption platform 102. For example, the initiating computing device 103 may establish a first wireless data connection with the cloud based encryption platform 102 to link the initiating computing device 103 with the cloud based encryption platform 102 (e.g., in preparation for uploading files, or the like). In some instances, the initiating computing device 103 may identify whether a connection is already established with the cloud based encryption platform 102. If a connection is already established with the cloud based encryption platform 102, the initiating computing device 103 might not re-establish the connection. If a connection is not yet established with the cloud based encryption platform 102, the initiating computing device 103 may establish the first wireless data connection as described herein.

At step 203, the initiating computing device 103 may upload an unencrypted file to the cloud based encryption platform 102. For example, the initiating computing device 103 may upload the unencrypted file to the cloud based encryption platform 102 while the first wireless data connection is established. In some instances, in uploading the unencrypted file to the cloud based encryption platform 102, the initiating computing device 103 may upload a document that includes some sensitive and/or otherwise confidential information.

At step 204, cloud based encryption platform 102 may identify one or more smart contracts for the unencrypted file, and may identify processing resources to perform the corresponding encryption/storage. For example, the cloud based encryption platform 102 may input information of the unencrypted file (e.g., file type, type of information included therein, or the like) and/or the unencrypted file itself into the homomorphic encryption model. For example, the homomorphic encryption model may output the one or more smart contracts, which may, e.g., indicate rules for which information and/or parameters from the unencrypted file should be presented in response to a request for the file, and which may, in some instances, be different based on an identity of the requestor (e.g., based on an IP address, user location, geolocation, and/or other information). In some instances, the homomorphic encryption model may generate the one or more smart contracts based on identifying similar (e.g., at least a predetermined threshold amount of matching information) file types, types of information included therein, file size, and/or other information.

Additionally, the cloud based encryption platform 102 may identify one or more processing resources to encrypt and/or store the unencrypted file. For example, the cloud based encryption platform 102 may input information of the unencrypted file (e.g., file type, type of information included therein, or the like), the unencrypted file itself, current processing conditions (e.g., current load, memory, availability, latency, and/or other information), geographic location, and/or other information into the homomorphic encryption model. For example, the homomorphic encryption model may output the one or more processing resources, which may, e.g., be used to encrypt and/or store the file once encrypted. In some instances, the homomorphic encryption model may identify the one or more processing resources based on identifying similar (e.g., at least a predetermined threshold amount of matching information) file types, types of information included therein, file size, processing conditions, and/or other information Referring to FIG. 2B, at step 205, the cloud based encryption platform 102 may encrypt the unencrypted file to produce an encrypted file. For example, the input of the unencrypted file into the homomorphic encryption model may trigger homomorphic encryption of the unencrypted file. In doing so, the cloud based encryption platform 102 may produce an encrypted file that may remain encrypted despite transmission of the encrypted file and/or other attempts to access the encrypted file, which may, e.g., provide enhanced security for any confidential or otherwise sensitive information included therein.

Figure 2B:
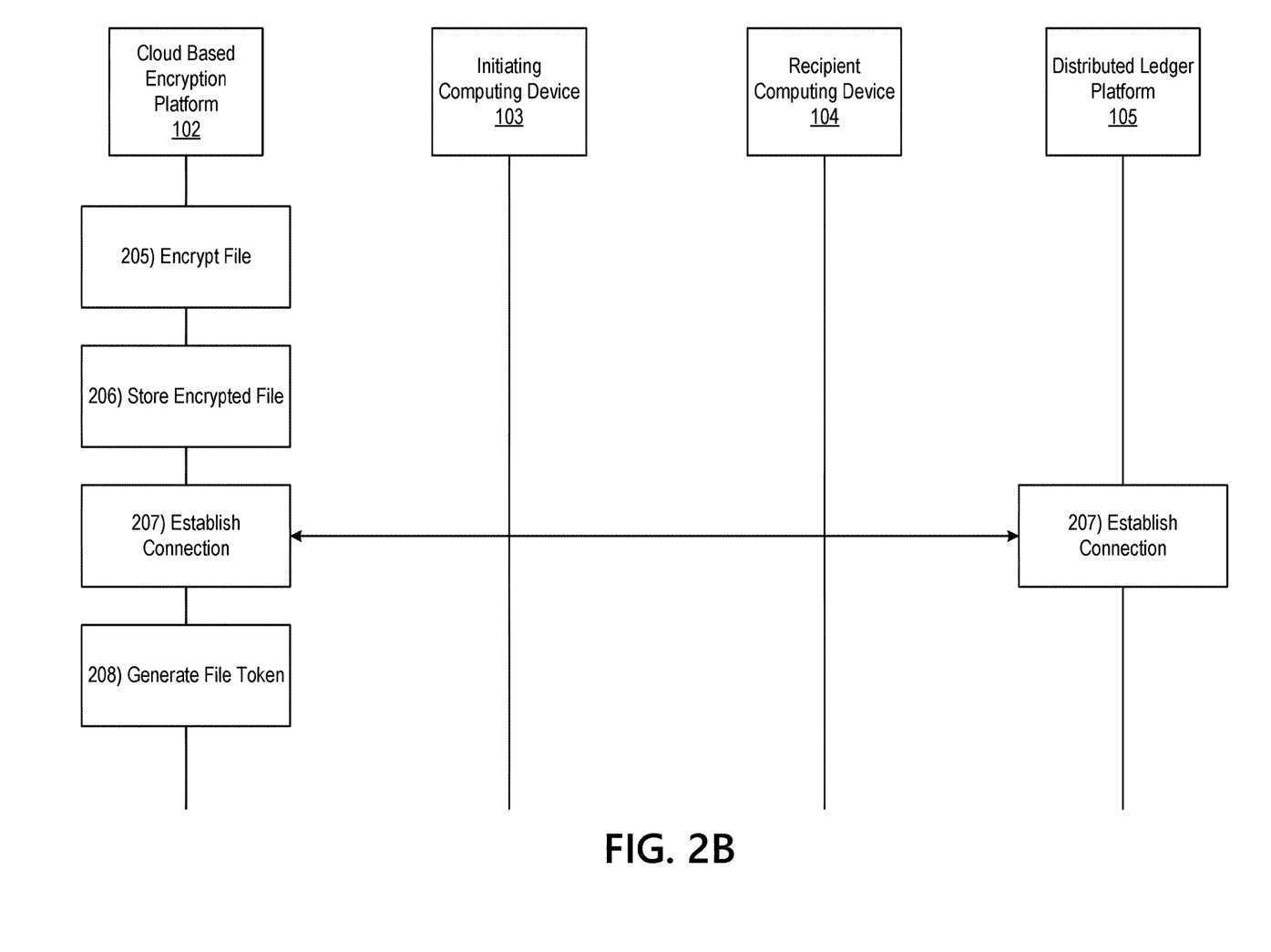

At step 206, the cloud based encryption platform 102 may store the encrypted file using the processing resources identified by the homomorphic encryption model at step 204. At step 207, the cloud based encryption platform 102 may establish a connection with the distributed ledger platform 105. For example, the cloud based encryption platform 102 may establish a second wireless data connection with the distributed ledger platform 105 to link the cloud based encryption platform 102 to the distributed ledger platform 105 (e.g., in preparation for performing distributed storage of file tokens). In some instances, the cloud based encryption platform 102 may identify whether or not a connection is already established with the distributed ledger platform 105. If a connection is not yet established with the distributed ledger platform 105, the cloud based encryption platform 102 may establish the second wireless data connection as described herein.

At step 208, the cloud based encryption platform 102 may generate a file token representative of the file. For example, the cloud based encryption platform 102 may generate a non-fungible token, crypto token, and/or other token representative of the file.

Figure 2C:
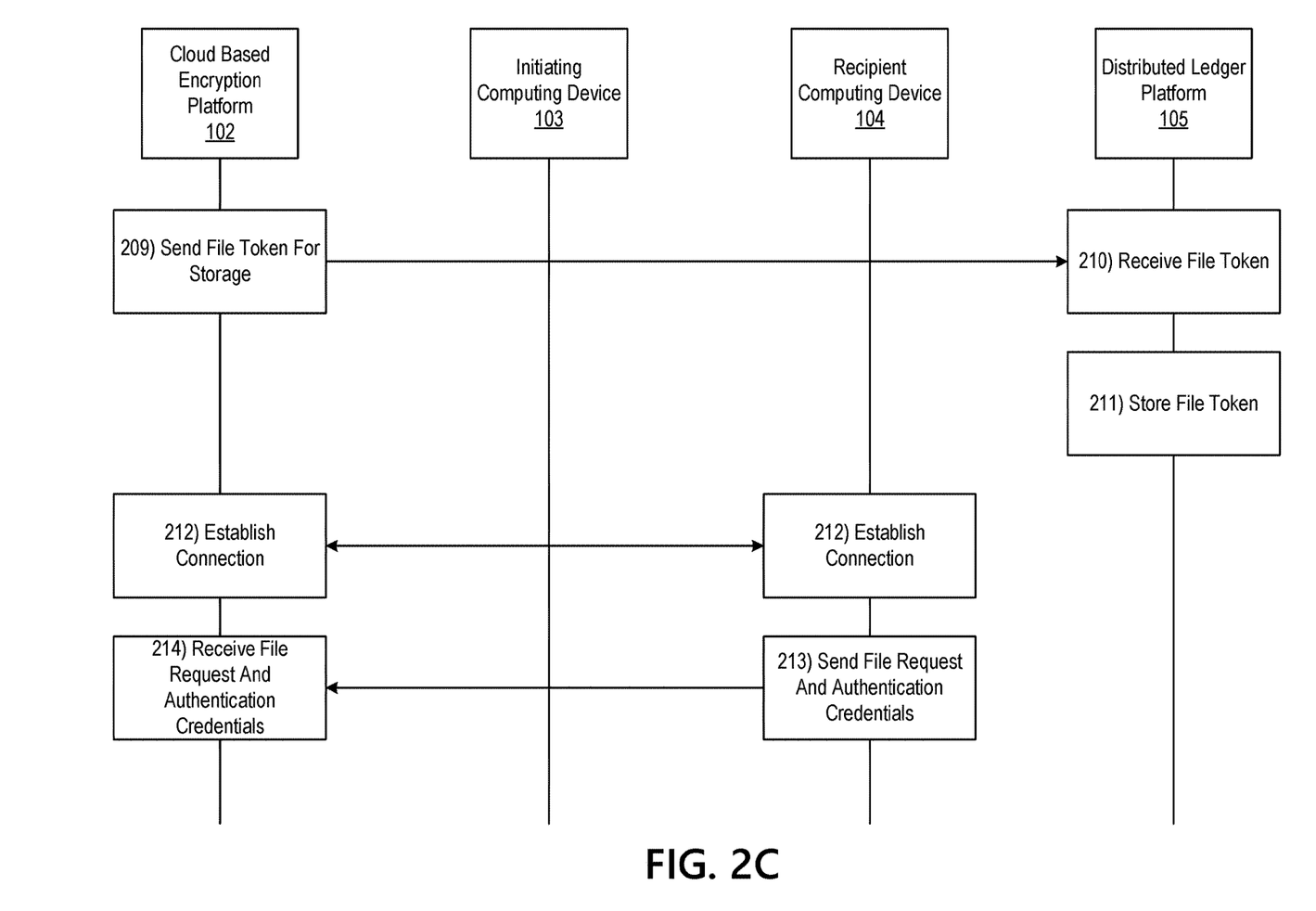

Referring to FIG. 2C, at step 209, the cloud based encryption platform 102 may send the file token for storage at the distributed ledger platform 105. For example, the cloud based encryption platform 102 may send the file token to the distributed ledger platform 105 via the communication interface 113 and while the second wireless data connection is established.

At step 210, the distributed ledger platform 105 may receive the file token sent at step 209. For example, the distributed ledger platform 105 may receive the file token while the second wireless data connection is established.

At step 211, the distributed ledger platform 105 may store the file token using the distributed ledger. For example, the distributed ledger platform 105 may store the file token as a new entry in the distributed ledger, which may, e.g., be a blockchain, holochain, and/or other ledger. In doing so, the distributed ledger platform 105 may store the file token in a distributed and immutable way, which may, e.g., be accessed by users to identify parameters and/or information of the file. In some instances, this may be done in addition or as an alternative to accessing the parameters/information of the encrypted file as described herein.

At step 212, the recipient computing device 104 may establish a connection with the cloud based encryption platform 102. For example, the recipient computing device 104 may establish a third wireless data connection with the cloud based encryption platform 102 to link the recipient computing device 104 to the cloud based encryption platform 102 (e.g., in preparation for accessing file information). In some instances, the recipient computing device 104 may identify whether or not a connection is already established with the cloud based encryption platform 102. If a connection is already established with the cloud based encryption platform 102, the recipient computing device 104 might not re-establish the connection. If a connection is not yet established with the cloud based encryption platform 102, the recipient computing device 104 may establish the third wireless data connection as described herein.

At step 213, the recipient computing device 104 may send a request to access the encrypted file to the cloud based encryption platform 102. In some instances, the recipient computing device 104 may also send authentication credentials on behalf of a recipient user. In some instances, the recipient computing device 104 may send the request to access the encrypted file and/or the authentication credentials to the cloud based encryption platform 102 while the third wireless data connection is established.

At step 214, the cloud based encryption platform 102 may receive the request to access the encrypted file and/or the authentication credentials sent at step 213. For example, the cloud based encryption platform 102 may receive the request to access the encrypted file and/or the authentication credentials via the communication interface 113 and while the third wireless data connection is established.

Figure 2D:
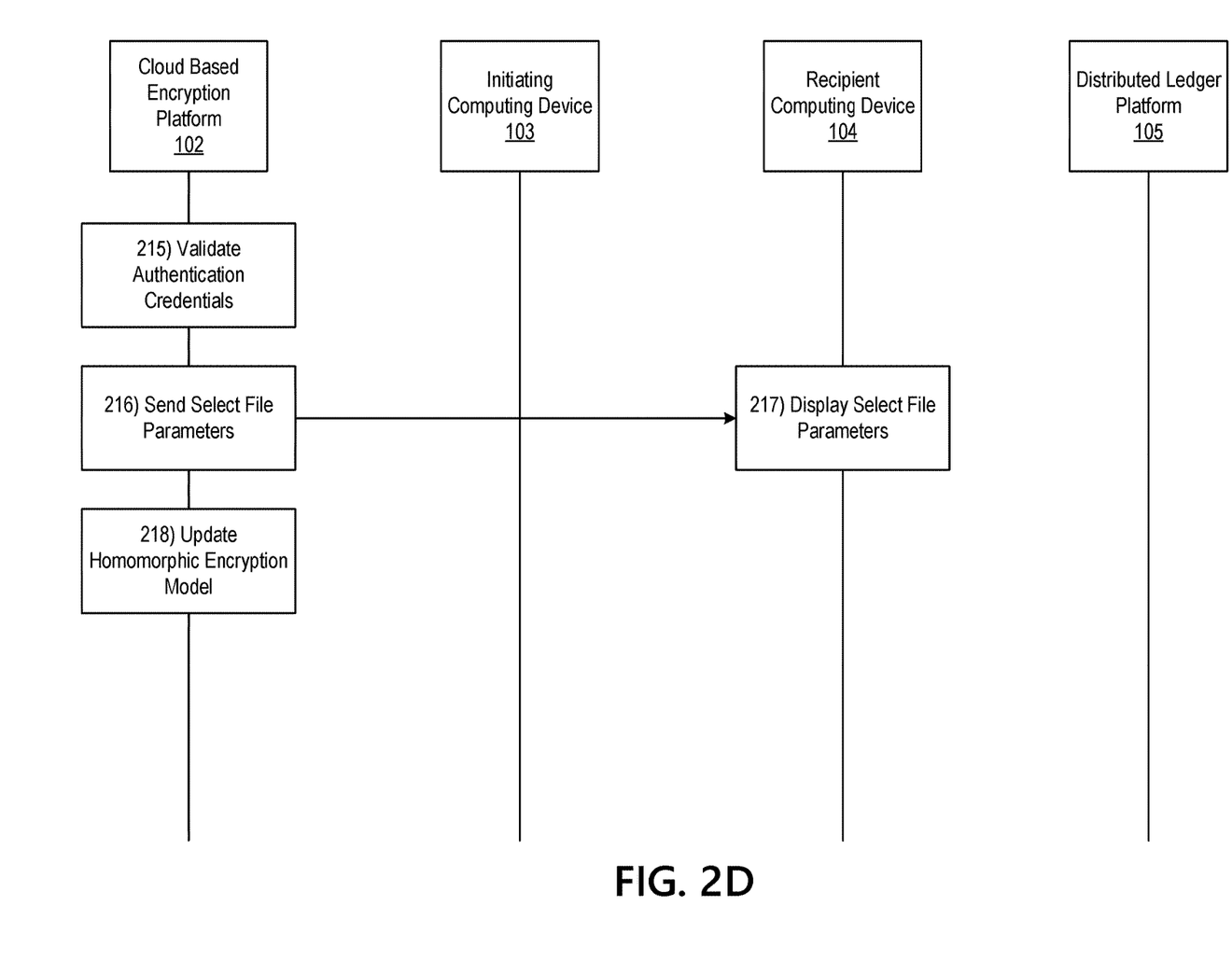

Referring to FIG. 2D, at step 215, the cloud based encryption platform 102 may validated the authentication credentials received at step 214. In some instances, in validating the authentication credentials, the cloud based encryption platform 102 may further identify a sub-contract (e.g., a child smart contract corresponding to the parent smart contract identified at step 204). For example, multiple different users may have access to the file, but they may have varied levels of access to information included therein. In some instances, the cloud based encryption platform 102 may validate the authentication credentials based on validating one or more of an IP address, user location, geolocation, and/or other information associated with the authentication credentials. In instances where the authentication credentials are validated, the cloud based encryption platform 102 may proceed to step 216. Otherwise, if the authentication credentials are not validated, the cloud based encryption platform 102 may proceed to step 218.

At step 216, the cloud based encryption platform 102 may send the information and/or parameters identified based on the smart contract and/or any sub-contracts therein for display at the recipient computing device 104. For example, the cloud based encryption platform 102 may make this information and/or parameters available via an application programming interface (API) at the recipient computing device 104. In doing so, the cloud based encryption platform 102 may make specific information from the encrypted file, rather than the encrypted file itself, available to the recipient computing device 104, and thus, the encrypted file may remain encrypted (e.g., rather than decrypting the encrypted file to display the file at the recipient computing device 104).

Figure 4:
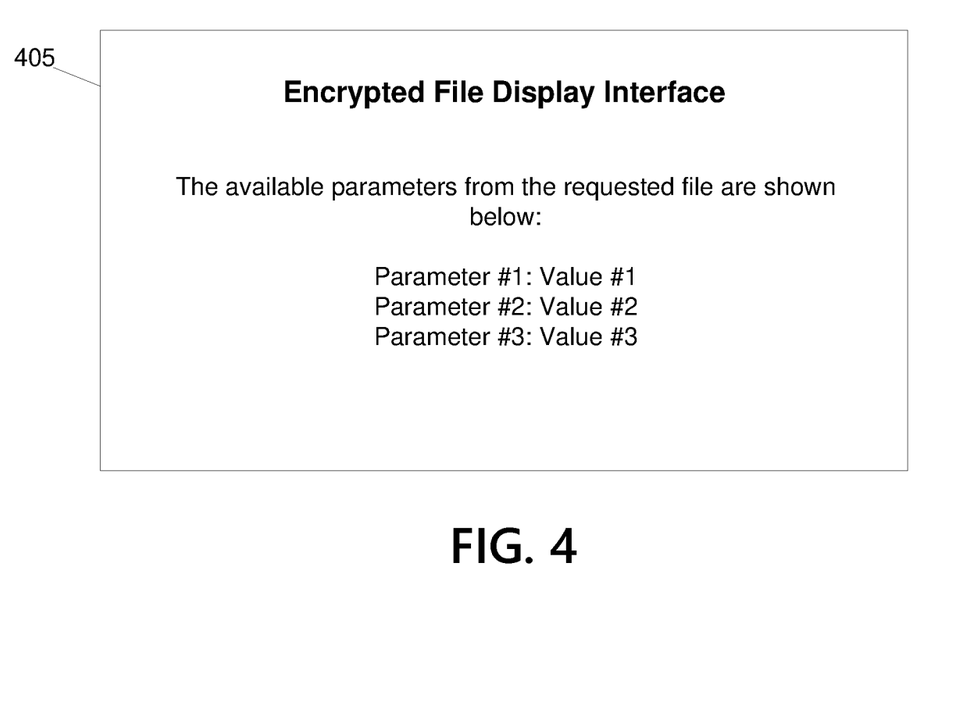
FIG. 4 depicts an illustrative user interface for leveraging artificial intelligence and homomorphic encryption in a cloud based environment in accordance with one or more example embodiments.

At step 217, the recipient computing device 104 may receive and display the information and/or parameters sent at step 216. For example, the recipient computing device 104 may display the information and/or parameters via the API, which may, e.g., be a graphical user interface similar to graphical user interface 405, which is shown in FIG. 4. In some instances, this API may be configured with logic configured to retrieve, manipulate, show, read, and/or otherwise access the information and/or parameters from the encrypted file.

At step 218, the cloud based encryption platform 102 may update the homomorphic encryption model based on the identified smart contracts, the identified processing resources, processing conditions, the file, user feedback information, and/or other information. In doing so, the cloud based encryption platform 102 may continue to refine the homomorphic encryption model using a dynamic feedback loop, which may, e.g., increase the accuracy and effectiveness of the model in securing, encrypting, and storing sensitive and/or otherwise confidential files.

For example, the cloud based encryption platform 102 may use the identified smart contracts, the identified processing resources, processing conditions, the file, user feedback information, and/or other information to reinforce, modify, and/or otherwise update the homomorphic encryption model, thus causing the model to continuously improve (e.g., in terms of performing file encryption and storage).

For example, in some instances, the cloud based encryption platform 102 may update the homomorphic encryption model to include new smart contracts/processing resources, remove existing smart contracts/processing resources, and/or otherwise modify the available smart contracts/processing resources based on receiving consensus feedback information indicating that the smart contract and/or processing resources resulted in successful and/or unsuccessful concealment of confidential and/or otherwise sensitive information. In doing so, the cloud based encryption platform 102 may minimize a leakage of information corresponding to the input files.

In some instances, the cloud based encryption platform 102 may continuously refine the homomorphic encryption model. In some instances, the cloud based encryption platform 102 may maintain an accuracy threshold for the homomorphic encryption model, and may pause refinement (through the dynamic feedback loops) of the model if the corresponding accuracy is identified as greater than the corresponding accuracy threshold. Similarly, if the accuracy fails to be equal or less than the given accuracy threshold, the cloud based encryption platform 102 may resume refinement of the model through the corresponding dynamic feedback loop.

By operating in this way, sensitive and/or otherwise confidential information may be encrypted, and any information/parameters included therein may be shared with authorized parties without causing decryption of the entire file itself. Rather, an API may be used on a computing device of the authorized party to access only portions of the information and/or parameters of a given file to which they have access.

Although the illustrative event sequence described above primarily relates to the homomorphic encryption of files, the same techniques may be used to secure other information (e.g., payments, data, or the like) without departing from the scope of the disclosure.

Figure 3:
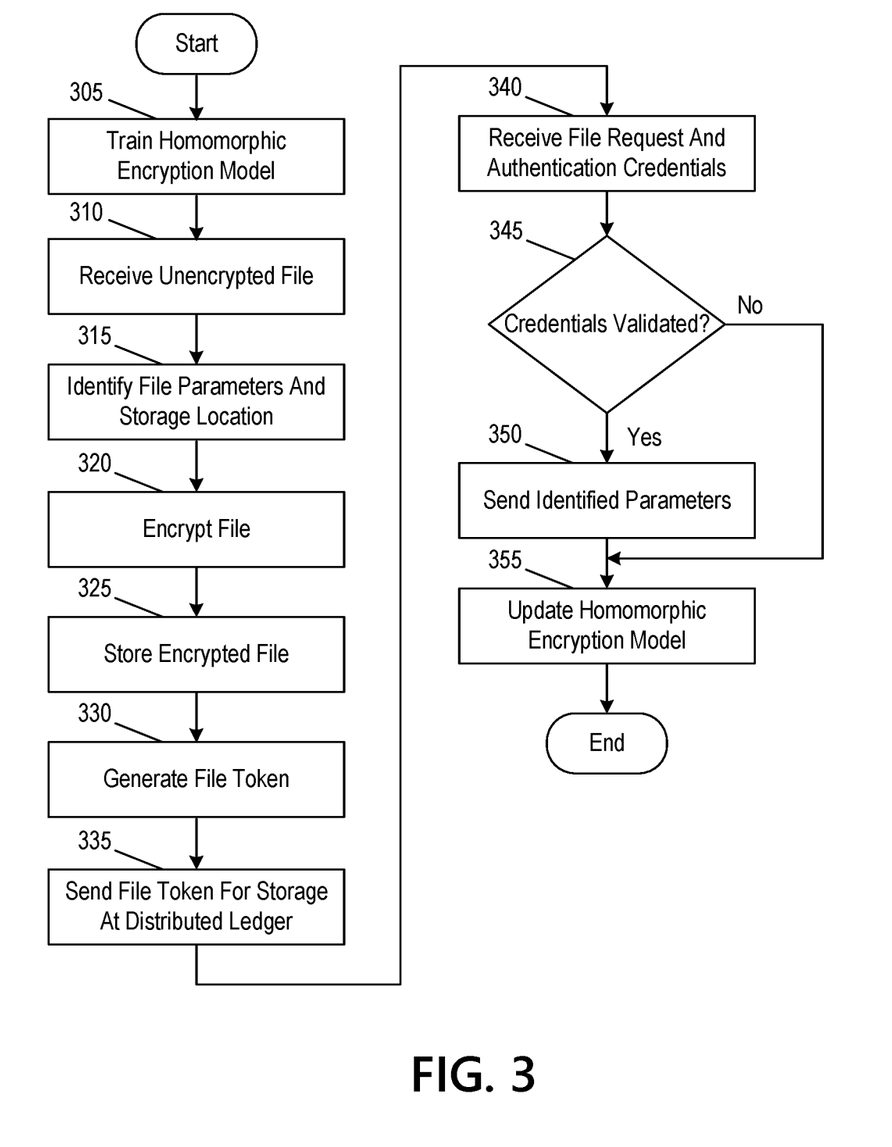
FIG. 3 depicts an illustrative method for leveraging artificial intelligence and homomorphic encryption in a cloud based environment in accordance with one or more example embodiments.

FIG. 3 depicts an illustrative method for leveraging artificial intelligence and homomorphic encryption in a cloud based environment in accordance with one or more example embodiments. At step 305, a computing platform having at least one processor, a communication interface, and memory may train a homomorphic encryption model. At step 310, the computing platform may receive an unencrypted file. At step 315, the computing platform may input the unencrypted file into the homomorphic encryption model to identify file parameters/information to obscure/expose and/or processing resources for the unencrypted file. At step 320, the computing platform may encrypt the unencrypted file. At step 325, the computing platform may store the encrypted file. At step 330, the computing platform may generate a token for the file. At step 335, the computing platform may send the token for storage at a distributed ledger. At step 340, the computing platform may receive a request to access the file and authentication credentials. At step 345, the computing platform may attempt to validate the authentication credentials. If the authentication credentials are validated, the computing platform may proceed to step 350. Otherwise, if the authentication credentials are not validated, the computing platform may proceed to step 355. At step 350, the computing platform may grant a requesting device access to the identified file parameters/information. At step 355, the computing platform may update the homomorphic encryption model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
   train, using smart contract and file type information, a homomorphic encryption model, wherein training the homomorphic encryption model configures the homomorphic encryption model, by establishing stored correlations between the file type information and the smart contracts, to identify, based on a given file type for a given input file, a corresponding smart contract defining a corresponding set of parameters, included in the given input file, for display, wherein the homomorphic encryption model comprises one of a supervised learning model or an unsupervised learning model, and wherein the homomorphic encryption model is further trained using historical system performance information, and wherein training the homomorphic encryption model using the historical system performance information configures the homomorphic encryption model to output, for the given input file, one or more corresponding processing resources of the computing platform at which to perform homomorphic encryption of an encrypted file;
   receive an unencrypted file;
   identify, by inputting the unencrypted file into the homomorphic encryption model, a smart contract defining one or more parameters for display, wherein the homomorphic encryption model identifies the smart contract by:
      comparing a file type of the unencrypted file to the file type information used to train the homomorphic encryption model, and
      identifying, based on the stored correlations between the file type information and the smart contracts, the smart contract corresponding to the file type;
   encrypt, using homomorphic encryption, the unencrypted file to produce the encrypted file;
   store the encrypted file;
   receive, via an application programming interface (API) at a user device, a request to access the encrypted file and authentication credentials; and
   send, based on the smart contract, based on validation of the authentication credentials, and for display at the user device via the API, the parameters for display.

2. The computing platform of claim 1, wherein the homomorphic encryption model comprises an artificial intelligence (AI) model.

3. The computing platform of claim 1, wherein the memory stores additional computer-readable instructions that, when executed by the at least one processor, further cause the computing platform to:
   identify, by inputting the unencrypted file and current system performance information into the homomorphic encryption model, one or more processing resources of the computing platform at which to perform the homomorphic encryption of the encrypted file.

4. The computing platform of claim 3, wherein the current system performance information comprises system latency, available memory, available processing resources, and system load.

5. The computing platform of claim 1, wherein the smart contract defines the one or more parameters for display and one or more parameters to remain concealed.

6. The computing platform of claim 1, wherein the smart contract defines different parameters for display for different users.

7. The computing platform of claim 1, wherein the memory stores additional computer-readable instructions that, when executed by the at least one processor, further cause the computing platform to:
   generate a file token representing the unencrypted file; and
   store, using a distributed ledger, the file token.

8. The computing platform of claim 7, wherein the file token comprises one of a non-fungible token (NFT) or a crypto token.

9. The computing platform of claim 1, wherein sending the parameters for display comprises sending the parameters without decrypting the encrypted file.

10. The computing platform of claim 1, wherein the memory stores additional computer-readable instructions that, when executed by the at least one processor, further cause the computing platform to:

update, based on the identified smart contract, the homomorphic encryption model.

11. The computing platform of claim 1, wherein the memory stores additional computer-readable instructions that, when executed by the at least one processor, further cause the computing platform to:
identify, based on the authentication credentials, a user identity, wherein sending the parameters for display comprises sending, based on the user identity, a subset of the parameters for display.

12. A method comprising:
at a computing platform comprising at least one processor, a communication interface, and memory:
training, using smart contract and file type information, a homomorphic encryption model, by establishing stored correlations between the file type information and the smart contracts, wherein training the homomorphic encryption model configures the homomorphic encryption model to identify, based on a given file type for a given input file, a corresponding smart contract defining a corresponding set of parameters, included in the given input file, for display, wherein the homomorphic encryption model comprises one of a supervised learning model or an unsupervised learning model, and wherein the homomorphic encryption model is further trained using historical system performance information, and wherein training the homomorphic encryption model using the historical system performance information configures the homomorphic encryption model to output, for the given input file, one or more corresponding processing resources of the computing platform at which to perform homomorphic encryption of an encrypted file;
receiving an unencrypted file;
identifying, by inputting the unencrypted file into the homomorphic encryption model, a smart contract defining one or more parameters for display, wherein the homomorphic encryption model identifies the smart contract by:
comparing a file type of the unencrypted file to the file type information used to train the homomorphic encryption model, and
identifying, based on the stored correlations between the file type information and the smart contracts, the smart contract corresponding to the file type;
encrypting, using homomorphic encryption, the unencrypted file to produce the encrypted file;
storing the encrypted file;
receiving, via an application programming interface (API) at a user device, a request to access the encrypted file; and
sending, based on the smart contract and for display at the user device via the API, the parameters for display.

13. The method of claim 12, wherein the homomorphic encryption model comprises an artificial intelligence (AI) model.

14. The method of claim 12, further comprising:
identifying, by inputting the unencrypted file and current system performance information into the homomorphic encryption model, one or more processing resources of the computing platform at which to perform the homomorphic encryption of the encrypted file.

15. The method of claim 14, wherein the current system performance information comprises system latency, available memory, available processing resources, and system load.

16. The method of claim 12, wherein the smart contract defines the one or more parameters for display and one or more parameters to remain concealed.

17. The method of claim 12, wherein the smart contract defines different parameters for display for different users.

18. One or more non-transitory computer-readable media storing instructions that, when executed by a computing platform comprising at least one processor, a communication interface, and memory, cause the computing platform to:
train, using smart contract and file type information, a homomorphic encryption model, wherein training the homomorphic encryption model configures the homomorphic encryption model, by establishing stored correlations between the file type information and the smart contracts, to identify, based on a given file type for a given input file, a corresponding smart contract defining a corresponding set of parameters, included in the given input file, for display, wherein the homomorphic encryption model comprises one of a supervised learning model or an unsupervised learning model, and wherein the homomorphic encryption model is further trained using historical system performance information, and wherein training the homomorphic encryption model using the historical system performance information configures the homomorphic encryption model to output, for the given input file, one or more corresponding processing resources of the computing platform at which to perform homomorphic encryption of an encrypted file;
receive an unencrypted file;
identify, by inputting the unencrypted file into the homomorphic encryption model, a smart contract defining one or more parameters for display, wherein the homomorphic encryption model identifies the smart contract by:
comparing a file type of the unencrypted file to the file type information used to train the homomorphic encryption model, and
identifying, based on the stored correlations between the file type information and the smart contracts, the smart contract corresponding to the file type;
encrypt, using homomorphic encryption, the unencrypted file to produce the encrypted file;
store the encrypted file;
receive, via an application programming interface (API) at a user device, a request to access the encrypted file; and
send, based on the smart contract and for display at the user device via the API, the parameters for display.

19. The one or more non-transitory computer-readable media of claim 18, wherein the homomorphic encryption model comprises an artificial intelligence (AI) model.

20. The one or more non-transitory computer-readable media of claim 18, wherein the memory stores additional computer-readable instructions that, when executed by the at least one processor, further cause the computing platform to:
identify, by inputting the unencrypted file and current system performance information into the homomorphic encryption model, one or more processing resources of the computing platform at which to perform the homomorphic encryption of the encrypted file.

* * * * *